3,784,553
PYRIDOXINE ALPHA-KETOGLUTARATE AND
ITS DERIVATIVES
Cristobal Martinez Roldan and Dario Rodrigues Devesa,
Madrid, Spain, assignors to Laboratories Made, S.A.,
Madrid, Spain
No Drawing. Continuation of abandoned application Ser.
No. 878,959, Nov. 21, 1969. This application Jan. 17,
1972, Ser. No. 218,614
Int. Cl. C07d 31/32
U.S. Cl. 260—297.5                    2 Claims

ABSTRACT OF THE DISCLOSURE

Pyridoxine alpha-ketoglutarate is prepared by reacting pyridoxine with alpha ketoglutaric acid or functional derivative thereof, in an organic or inorganic solvent. The compound is useful for improving neuronal metabolism, treating tremors, convulsions and nervous problems and alcoholism. It possesses an anabolic activity and affects fatty acid metabolish. It also is an anti-anemia agent and is useful for treating skin diseases.

---

This is a continuation of application Ser. No. 878,959, filed Nov. 21, 1969, now abandoned.

This invention concerns pyridoxine alpha-ketoglutarate and derivatives thereof and a process for their preparation.

In accordance with the invention there are provided compounds having the general formula:

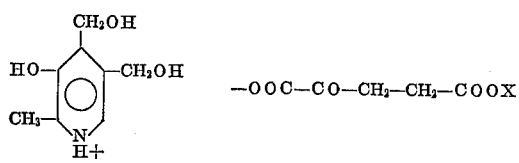

where X is a hydrogen atom, an alkali or alkaline-earth metal, or an organic base.

The invention also provides a process for preparing the compounds of the invention comprising admixing solutions of pyridoxine and a compound of the formula

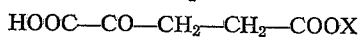

where X is as defined above, in an appropriate organic or in organic solvent, e.g., water or T.H.F. or, preferably ethanol.

It is desirable that the solutions should be prepared immediately before mixing. It is also desirable to use equimolar quantities of the pyridoxine and the alpha-ketoglutanic acid or derivative thereof.

The desired product may be precipitated by cooling, concentrating, or adding an appropriate solvent (i.e., a solvent in which the product is not soluble) to the resulting mixture.

When the product is pyridoxine alpha-ketoglutarate, it may be neutralized with an organic or inorganic base to produce a compound of the invention in which X is other than a hydrogen atom. The pyridoxine alpha-ketoglutarate is preferably dissolved in water before neutralization is carried out. Again the final desired product may be precipitated by cooling, or concentrating or adding an appropriate solvent to the resulting mixture.

The invention further provides a pharamceutical composition comprising a compound of the invention together with an inert, non-toxic carrier, diluent or coating.

EXAMPLE

Alpha-ketoglutaric acid (146.10 g., 1 mole) is dissolved in hot ethanol (300 ml.) and the resulting solution is mixed with a similarly hot ethanol solution of pyridoxine (169.14 g., 1 mole) (500 ml.). The resulting mixture is heated to boiling point and, if necessary, filtered at this temperature in order to free the mixture of any possible solid substance in suspension. The solution thus obtained is kept in a refrigerator overnight and then filtered. The yield of pyridoxine alpha-ketoglutarate thus obtained is between 75% and 90%, but precipitation may be increased by addition of ether.

The product is recrystallized from ethanol and assayed. Assay of the pyridoxine alpha-ketoglutarate: Calculated for $C_{17}H_{17}NO_8$ (percent): G, 49.52; H, 5.39; N, 4.44. Found (percent): C, 49.57; H, 5.68; N, 4.62.

Infrared spectrum: the most characteristic bands appear at 3289 (alcoholic-OH), 2940 (OH of the carboylic group), 1720 and 1420 (acid-CO), 1635 (carboxylate anion) and 500 cm. $^{-1}$ (pyridine ring).

Nuclear magnetic resonance spectrum ($D_2O$): bands appears at 7.6 (3 hydrogens corresponding to the methyl group of the pyridoxine); 7.4 (4 hydrogens corresponding to the 2 methylene groups of the alpha-ketoglutarate); 5.0 (4 hydrogen corresponding to the 2 alcoholic methylene groups); and 1.9 (1 hydrogen corresponding to the alpha-pyridine group) p.p.m. The product is a solid consisting of white crystals, M.P.=120.5–121.5° C. (not corrected). The product is soluble in water and hot ethanol, and sparingly double in tetrahydrofuran; it is insoluble in benzene, other, ligroin, acetone and chloroform.

The product gives a blood-red color with ferric chloride, and an emerald green color with copper sulphate.

Solutions of pyridoxine alpha-ketoglutarate in water have a pH=3.2, which does not change within a broad range of concentrations, i.e. from 1% to 50%.

This is due to the buffering action of the salt, pyridoxine alpha-glutarate, with the base, pyridoxine. Or comparing the variations in pH of solutions of alphaketoglutaric acid and of pyridoxine hydrochloride having various concentrations, it appears that the greater the concentration the more intense is the pH acidity, with a limit fixed by the solubility of the substances. An equimolar mixture of alpha-ketoglutaric acid and pyridoxine hydrochloride reaches pH values of a higher acidity than that previously mentioned, including a difference of nearly three pH units by comparison with pyridoxine ketoglutarate.

Therefore, some properties of pyridoxine alpha-ketoglutarate solutions may be deduced from the pH values. Various concentrations may be used in buffer solutions and the solubility of the base pyridoxine is greater in the form of the ketoglutarate than in any other inorganic salt.

The compounds of the invention have been studied from a pharmacological view and the following conclusions have been carried out for the product pyridoxine alpha-ketoglutarate.

The acute toxicity of pyridoxine alpha-ketoglutarate is much ( about 1.7 times) lower than that of an equimolar mixture of pyridoxine hydrochloride and alpha-ketoglutaric acid, but its useful pharmacological shows no significant heterogenity or proportionality. $DL_{50}$ of the new product is 21 mg./mouse; the slanting regression line having the relationship dose/effect=1.23 according to Litchfield-Wilcoxon's procedure.

A study of the toxicity of pyridoxine alpha-ketoglutarate shows that this product is very tolerable in experimental animals (young mice) for up to 90-day observation periods. Mice receiving a daily dose of 0.5 mg., per mouse, even increased their weight from the 40th day in comparison with animals of a control lot, and this remained till the end of the experiment.

The possible teratogenic activity of the product has been studied on rabbits and mice and no alterations have appeared. Furthermore litters from female mice which have been under treatment showed better weight than untreated ones.

Generally, the the animals under treatment, either for purpose of chronic toxicity or in teralogenic tests, exhibited an increased appetite for rich protein diets.

In tests on mice, an anticonvulsive action against thiosemicarbazide has been proved. This activity, statistically significant, is superior to that of pyridoxine hydrochloride.

Animals treated with pyridoxine alpha-ketoglutarate were protected by 100 percent, while about 16.6% of those receiving equivalent amounts of hydrochloride showed convulsive seizures, and about 40% of those receiving only thiosemicarbazide were effected by consulsions.

Protection extends similarly to fatalities caused by thiosemicarbazide.

This anticonvulsive activity has also been studied against beta-ethyl-beta-methyl glutarimide (Bemegride) and likewise a protective effect could be verified, less important but, however, statistically significant and slightly superior to the pyridoxine hydrochloride. The treated animals were more protected and the convulsive attacks that did occur in some animals were less intense and of shorter duration.

Hyposis-anaesthesia induced by barbiturates (pentobarbitol) is significatively shortened by pyridoxine alpha-ketoglutarate. The average effective time is about 2.7 times shorter than in controls. Regression lines in test and control lots run significantly parallel, the average effective time being 92 minutes for the control lot and 250 minutes for the test lot, and the slopes in time-response graphics were 2.43 and 1.96 respectively, according to J. T. Litchfield's method.

Pyridoxine alpha-ketoglutarate displays a brief and slight activity of vaso-pressor type when very high doses are administered.

Differences in intensity are not important in spite of differences in doses, being inferior in every case to that obtained by 2 meg./kg. of adrenaline in cats. The procedure used is a classical measurement of carotid pressure in a cat anaesthetized with pentobarbital.

From the above-mentioned properties of pyridoxine alpha-ketoglutarate its anticonvulsive activity against thiosemicarbazide or Bemegride and, similarly, its action against a barbituric-antagonist must be emphasized. In this respect, it is worth noting that while Bemegride is used as an antidote in barbiturate intoxication due to its neurostimulant activity, both peripheral and central, it may, if given in high dosage, cause seizures. Pyridoxine alpha-ketoglutarate surpasses Bemegride because it shortens the response time and, besides, has an anticonvulsive action.

Clinically, pyridoxine alpha-ketoglutarate has proved to be a useful therapeutical remedy, since in one single molecule are combined both pyridoxine and a ketoglutarate with the result that their useful effects are potentiated and certain aspects concerning their toxicity lessened. Pyridoxine alpha-ketoglutarate possesses interesting pharmacological properties which may be used effectively in various conditions which are briefly considered below.

(1) EFFECT ON NERVOUS SYSTEM

One of its principal indications is its use in several neurological conditions because it acts as an intermediate in cerebral metabolism where it plays four important roles.

(a) As a respiratory substratum;
(b) As a transamination agent of gamma aminobutyric acid;
(c) As a prostetic group of a specific enzyme decarboxylase glutamic acid which transforms glutamic acid into gamma amino-butyric acid;
(d) As an acceptor of $NH_3$ in detoxicant processes.

These multiple metabolic activities make the pharmacological effect of pyridoxine alpha-ketoglutarate useful in treating different processes such as:

(A) Deficiency in neuronal metabolism

Because of its wide metabolism participation, pyridoxine alpha-ketoglutarate enhances the respiratory and nutritional processes at cerebral cell level, exerting an actual metabolic regulation and producing beneficial effects in disturbance of behavior and language in children, intellectual deficiency, irritability, psychic stress, and neurotic troubles of various aethiology.

(B) Tremors

Pyridomine alpha-ketoglutarate has been shown to be useful in tremors of most various origins, ranging from "tremor senil," idiopathic tremor or even tremor due to Parkinson's disease. In these conditions dosage should be high and treatment cycles prolongated.

(C) Infant's convulsions

Pyridoxine alpha-ketoglutarate has given excellent results when used on this type of seizure in the first days, or even in the first hours, in life, occurring as crises with excitability or hyperexcitability in the neurones. Such crises are difficult to deal with as they are not controlled by routine anticonvulsive agents.

(D) Nervous troubles in isoniazid administration

The use of pyridoxine alpha-ketoglutarate remarkably improves such troubles, since they are produced by a competitive effect due to the structural analogy between isoniazid and vitamin $B_6$; these alterations are relatively frequent in protracted treatment of tuberculosis with isoniazid.

(E) Troubles in neuromuscular activity

Using pyrodoxine alpha-ketoglutarate in conditions such as syndromes of neutromuscular dysfuntion, myopathies, toxic neuritis and poly-neuritis, progressive muscular dystrophy, amiotrophic lateral sclerosis, etc., it appears that a remarkable improvement can be achieved, but further research is needed.

(F) Acute alcoholism

Pyridoxine alpha-keto glutarate when administered intravenously in high dosage, produces an anti-ethylic effect due to its aptness to stimulate the metabolism of alcohol.

(2) ANABOLIC ACTIVITY

Pyridoxine alpha-ketoglutarate has remarkable effect upon proteinic synthesis due to the important role that this substance play: in intermediate metabolism of amino acids, through the following pathways:

(a) It plays a role in transamination processes which result in the production of amino-acids from free keto-acids.
(b) It promotes active transport of amino-acids as intracellular components and intervenes in the incorporation of amino-acids into proteinic molecules.
(c) It intervenes positively in absorption of amino-acids from intestine walls.

Such properties make pyridoxine alpha-ketoglutarate a non-hormonal anabolic agent useful for management of conditions related to anorexia or weight-loss, convalescence asthenia, etc.

(3) ACTION ON FATTY ACID METABOLISM

There is a, still indistinct, relationship between pyridoxine alpha-ketoglutarate and atherosclerosis. It appears that the vitamin component in the pyridoxine alpha-ketogllutarate molecule will effect the essential fatty acid metabolism in a hypocholesteric sense, as well as by the role that it plays as a coferment in the transformation of linoleic acid into arachidonic acid. Therefore its use is indicated in atherosclerosis, and degenerative types of cardiovascular disease caused by excess cholestrerol.

(4) EFFECTS ON NEMATOPOIESIS

Owing to the role of pyridoxine alpha-ketoglutarate in the early stages of haemoglobin synthesis, emphasis should be placed on the antianaemic properties of this substance for treating some types of hypochromic or microcytic anaemias.

(5) EFFECTS ON HEPATIC COMA AND PRECOMA

Pyridoxine alpha-ketoglutarate has a detoxicant activity on ammonia in the blood due to its ability to be bound to the $NH_3$. This may be of great usefulness in cases of cirrohosis and hepatic failures with severe prognosis. Under these circumstances the detoxicant capacity of liver is very low and as a consequence a high level of $NH_3$ is present in the blood.

(6) OTHER INDICATIONS

There are indications that pyridoxine alpha-ketoglutarate may have other uses such as in vomiting, especially "hematemesis graviderum," in management of some skin diseases: eczema, seborrheic dermatitis "angulus infectiosus"; in carential diseases like beri-beri and pellagra; in some cardiac failures non-responsive to habitual therapy, etc.

Pyridoxine alpha-ketoglutarate has, in the specific applications for which it is suitable, the advantages of a good tolerance, potent pharmacological activity and good solubility in water.

What we claim is:
1. A compound of the formula

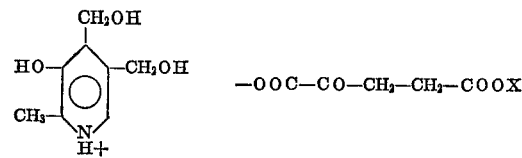

where X is a hydrogen atom, an alkali or alkaline earth metal.

2. Pyridoxine alpha-ketoglutarate.

References Cited
UNITED STATES PATENTS
3,732,235   5/1973   Martinez et al. ____ 260—295 VB
3,206,463   9/1965   Baetz _____ 260—297.5

OTHER REFERENCES
Chem. Abstracts, vol. 67, p. 6043, item Nos. 64,247b and 64.251y, Sept. 25, 1967.

ALAN L. ROTMAN, Primary Examiner

U.S. Cl. X.R.

260—295 VB; 424—263